United States Patent [19]

Kato et al.

[11] Patent Number: 4,714,973
[45] Date of Patent: Dec. 22, 1987

[54] SHUTTER ASSEMBLY FOR USE IN A DISC CARTRIDGE

[75] Inventors: Yoshitake Kato; Minoru Fujita, both of Ibaragi; Hiroshi Maruyama, Toride, all of Japan

[73] Assignee: Hitachi Maxell, Ltd., Osaka, Japan

[21] Appl. No.: 861,422

[22] Filed: May 9, 1986

[30] Foreign Application Priority Data

May 9, 1985 [JP] Japan .................................. 60-96599
May 9, 1985 [JP] Japan .................................. 60-96600

[51] Int. Cl.⁴ .............................................. G11B 23/03
[52] U.S. Cl. ..................................... 360/133; 206/444
[58] Field of Search ................. 360/133; 206/444, 387

[56] References Cited

U.S. PATENT DOCUMENTS 4,445,155  4/1984  Takahashi ............................ 360/99
4,476,978 10/1984  Saito .................................... 206/444
4,579,225  4/1986  Kato ................................. 360/133 X

FOREIGN PATENT DOCUMENTS 2110462  6/1983  United Kingdom ................ 360/133

Primary Examiner—A. J. Heinz
Attorney, Agent, or Firm—Birch, Stewart, Kolasch & Birch

[57] ABSTRACT

In a disc cartridge comprising a cartridge case and a shutter slidably mounted on the cartridge case for opening and closing a head accessing opening, the shutter comprises a first plate and a second plate opposing to the first plate, a connection member for connecting the first plate and the second plate, and a projection formed on at least one of the first and second plates of the shutter in such a manner that the projection is slanted toward the connection member.

9 Claims, 24 Drawing Figures

SHUTTER ASSEMBLY FOR USE IN A DISC CARTRIDGE

BACKGROUND OF THE INVENTION

1. Field of the Invention

The present invention relates to a disc cartridge having a shutter for closing and opening a head insertion hole of the disc cartridge.

2. Description of the Related Art

A conventional disc cartridge having a floppy magnetic disc in the thin cartridge case is shown in FIG. 1, wherein the cartridge comprises a thin case 51 of a generally rectangular shape and made of hard synthetic resin material, a magnetic disc 52 rotatably enclosed in the case 51 and a shutter 53 to be slidably mounted on the case 51 so as to move along one side or front side of the case 51.

In the central portion of the case 51, there are defined a circular opening 54 and a head accessing opening 55. A shallow recess 56 is defined on the top wall of the case 51 in the region near the head accessing opening 55 for sliding the shutter 53 pass the head accessing opening 55. A guide slot 57 is also defined in the top wall along the front side of the case 51 for guiding the movement of the shutter 53.

Conventionally the shutter 53 is formed of a stainless steel plate formed in a generally U shape in a side view having a pair of opposing plates 61a and 61b in each of which an opening 58 is defined with the generally same shape and size as the head accessing opening 55. A part 61 adjacent to the opening 58 acts as a lid plate. Two raised members 59 inwardly project on plate 61a by bending a part of the plate inwardly.

The raised members 59 are adapted to be slidably fitted in the guide slot 57 of the case 51. However, since the shutter 53 is made of a metal plate and the raised members are short, it is hard for the raised members 59 to be resiliently deformed when the shutter is mounted to the case 51, fitting the raised members 59 in the guide slot 57. In order to facilitate fitting the raised members 59 into the slot 57, there is formed one or more thin portions 60 in the front edge of the case 51 through which the raised members 59 are passed by bending the thin portions 60.

In order to protect the floppy disc from deformation by an external force, the case 51 is made of hard plastic resin materials. Therefore, it is difficult to produce a large amount of bending to the thin portions 60 in order to pass the raised members 59 since the resiliency of the case 51 is insufficient. Accordingly, to elongate the raised member 59 makes it difficult to mount the shutter 53 to the case 51. To cut the raised member 59 short makes it easier to mount the shutter on the case 51 fitting the raised members 57 in the slot, however, the shortened raised members 59 are easily disengaged from the slot, thereby resulting in easy disengagement of the shutter from the case 51. As mentioned above, control of the length of the raised members 57 must be severe.

SUMMARY OF THE INVENTION

An essential object of the present invention is to provide a disc cartridge having a shutter assembly which can be easily mounted on a cartridge case without unnecessary deformation of the cartridge case.

Another object of the present invention is to provide a disc cartridge having a shutter assembly which can move smoothly preventing the guide slot portion of the cartridge from being scraped.

According to the present invention, there is provided a disc cartridge comprising a cartridge case having at least a head accessing opening, a disc rotatably mounted in the cartridge case and a shutter capable of being slidably mounted on the cartridge case for opening and closing the head accessing opening, the shutter being movable along a guide slot defined on the cartridge case, the shutter comprising a first plate and a second plate opposing to the first plate, a connection member for connecting the first plate and the second plate, and a projection formed on at least one of the first and second plates of the shutter in such a manner that the projection is slanted toward the connection member.

DETAILED DESCRIPTION OF THE PREFERRED EMBODIMENTS

Figure 1:
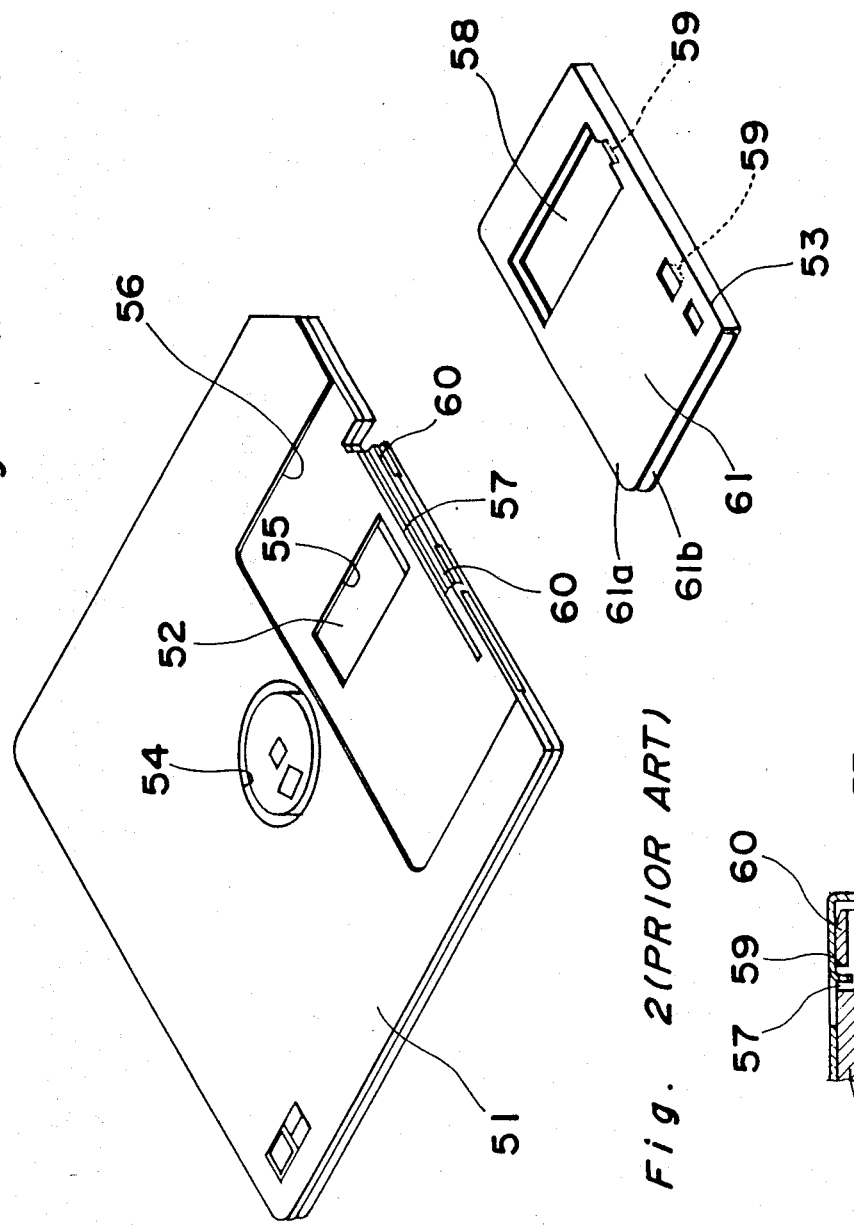
FIG. 1 is a perspective view showing an example of a conventional disc cartridge with a shutter disengaged.
Figure 2:
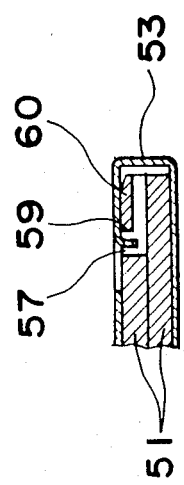
FIG. 2 is a cross sectional view showing an essential portion of the shutter mounted on the cartridge case of FIG. 1.

Referring to FIGS. 3 to 13, a disc cartridge according to the present invention is mainly comprised of a cartridge case 1, a magnetic disc 2 rotatably mounted in the cartridge case 1, and a shutter 3 slidably mounted on the cartridge case 1.

The cartridge case 1 comprises a first half case 1a and a second half case 1b, each being made of hard synthetic resin material such as an ABS resin, each being formed by a generally flat rectangular plate surrounded by low vertical walls in a known manner.

A drive shaft insertion opening 4 is defined in the central portion of the cartridge case 1, and an elongated head accessing opening 5 is defined near the drive shaft insertion opening 4. A shallow recess 6 is defined in the front portion of each half case so as to limit the movement of the shutter 3. The head accessing opening 5 is defined in the recess 6. A guide slot 7 is defined on each of the half case 1a and 1b near the front edge of the case 1 so as to extend in the direction of movement of the shutter 3. In the front edge portion of the first case half 1a, thin portions 21 are formed near the front edge of the cartridge case so as to be resiliently deformed for facilitating mounting of the shutter 3 as discussed later.

Figure 3:
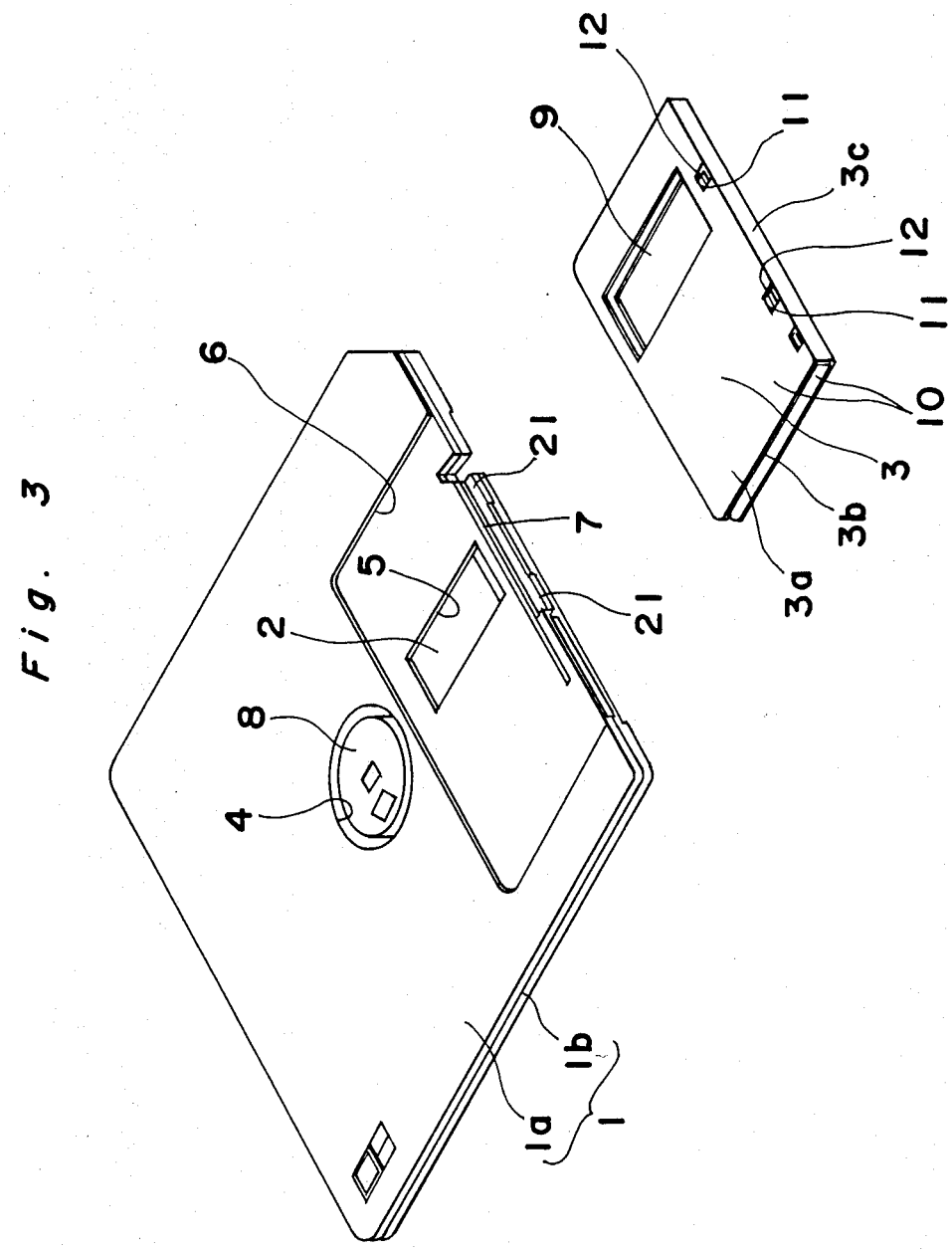
FIG. 3 is a perspective view showing an embodiment of a disc cartridge according to the present invention with a shutter disengaged.
Figure 4:
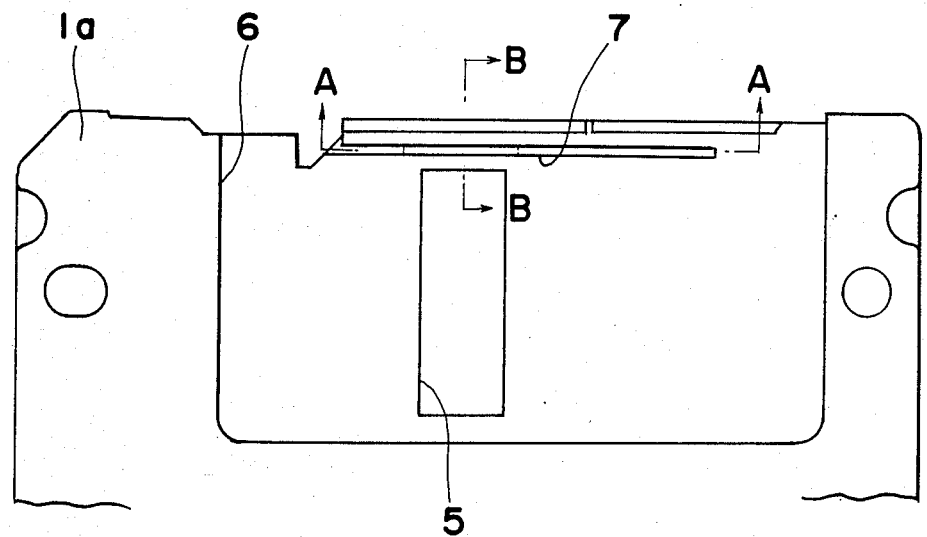
FIG. 4 is a partial top plan view of the disc cartridge according to the present invention.
Figure 5:
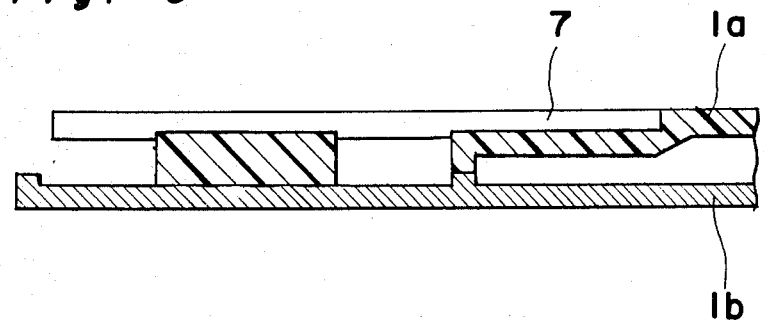
FIG. 5 is a cross sectional view taken along the lines A—A in FIG. 4.
Figure 6:
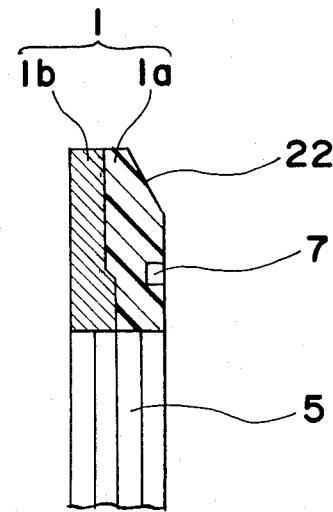
FIG. 6 is a cross sectional view taken along the lines B—B in FIG. 4.
Figure 7:
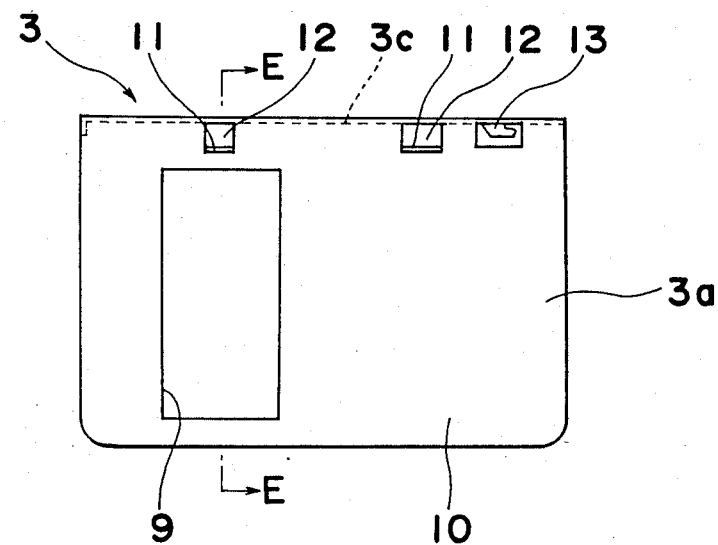
FIG. 7 is a top plan view of the shutter shown in FIG. 4.

The magnetic disc 2 is provided with a hub 8 which is rotatably accommodated in the drive shaft insertion opening 4 of the first case half 1a as shown in FIG. 3.

The shutter 3 is made of synthetic resin material such as polyacetal resin or polyamide resin with a predetermined resiliency, deformable easier than the cartridge case 1. The shutter 3 is formed by a first flat plate 3a, second flat plate 3b opposing in parallel with the first flat plate 3a and a connecting plate 3c for connecting both plates 3a and 3b, so that the shutter 3 is formed generally in a U character shape in a side elevational view. Each of the plates 3a and 3b is provided with an elongated rectangular opening 9, having the same size and shape as the head accessing opening 5, and a lid member 10. The opening 9 and the lid member 10 in the first plate 3a face the corresponding opening 9 and the lid member 10 of the second plate 3b.

Figure 11:
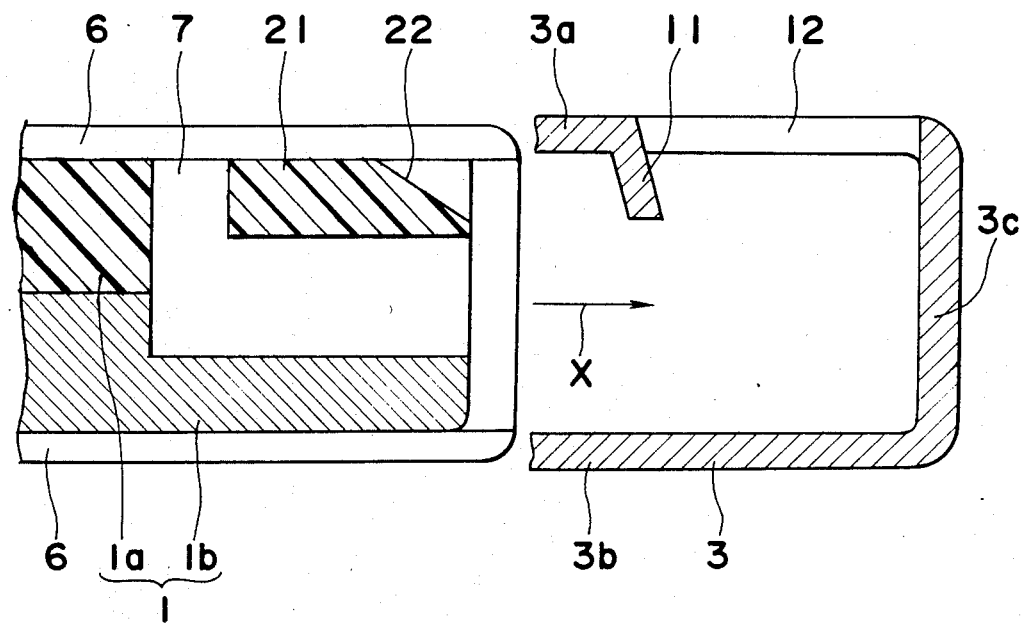
FIG. 11 is a cross sectional view similar to FIG. 10 with the shutter disengaged.
Figure 12:
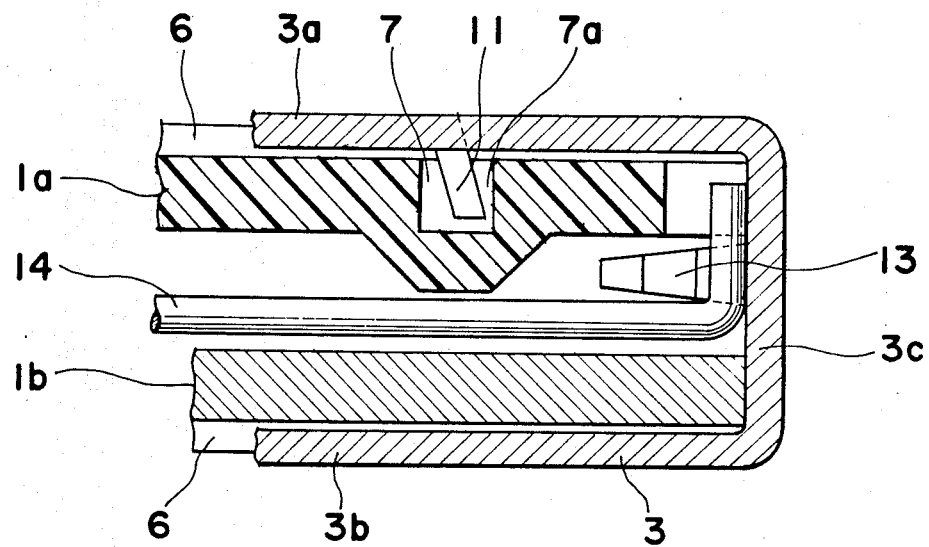
FIG. 12 is a cross sectional view taken along the lines D—D in FIG. 9.

Two projections 11 each in the form of a small plate positioned near the connecting plate 3c project from the first plate 3a toward the second plate 3b at a predetermined interval along the shutter 3. The projections 11 are so slanted that the free end of each projection 11 is directed toward the connecting plate 3c. It is appreciated that the projections 11 are formed at an angle relative to the first plate 3a, inclined toward the connecting plate 3c. In other words, the projections 11 are respectively slanted in the direction of X (as shown in FIG. 11) for corresponding to the direction of insertion of the disc case 1 into the shutter 3.

Figure 10:
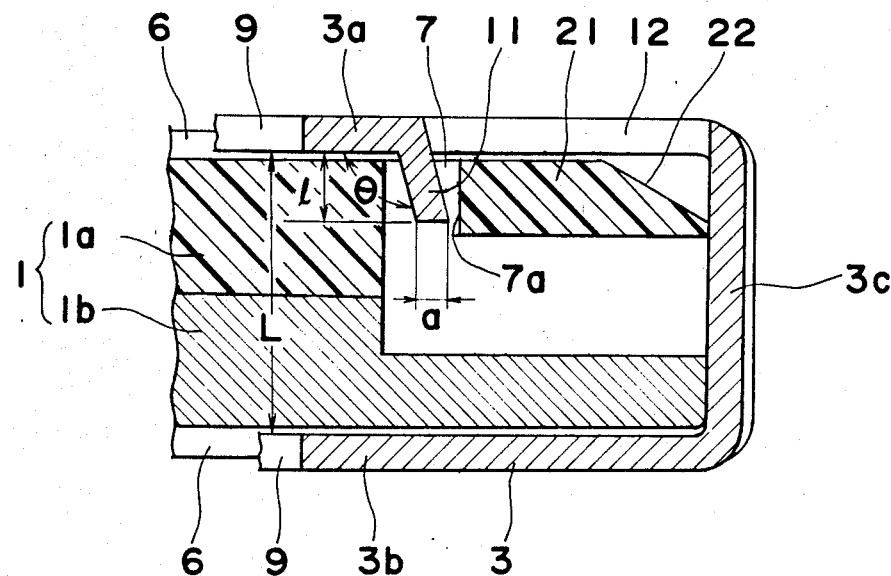
FIG. 10 is an enlarged cross sectional view taken along the lines C—C in FIG. 9.

The slanting angle $\theta$ of the projection 11 relative to the first plate 3a (as shown in FIG. 10) is preferably 95° to 120° and more preferably 100° to 110°. Generally, the greater the angle $\theta$, the easier it is to mount the shutter 3 on the disc case 1. However, in case the angle $\theta$ is too large, engagement of the respective projections 11 in the guide slot 7 may be unstable. Thus, the range of the slanting angle defined above is desired.

The thickness d of the projection 11 may be about 0.4 mm, for example, thicker than the thickness 0.35 mm of the shutter 3, so as to reinforce the projections 11. However, the thickness of the projections 11 may be thinner than 0.4 mm so as to be deformed at the time of insertion of the shutter 3 into the disc case 1.

Generally the longer the projection 11, the easier the deformation of the projection 11. Considering the above matter, the length l of the projection 11 may be about 0.7 mm, and the inner height L=2.8 mm between the first and second plates 3a and 3b of the shutter 3.

Two through holes 12 having a rectangular shape are defined between the respective projections 11 and the front most end of the disc case 1.

Another projection 13 is formed inside of the shutter at the center with respect to the distance between two plates 3a and 3b on the connecting plate 3c. A coil spring 14 is suspended between the projection 13 and a suitable position on the cartridge case 1 so that the shutter 3 is always biassed toward the closing direction to close the head accessing opening 5.

Figure 13:
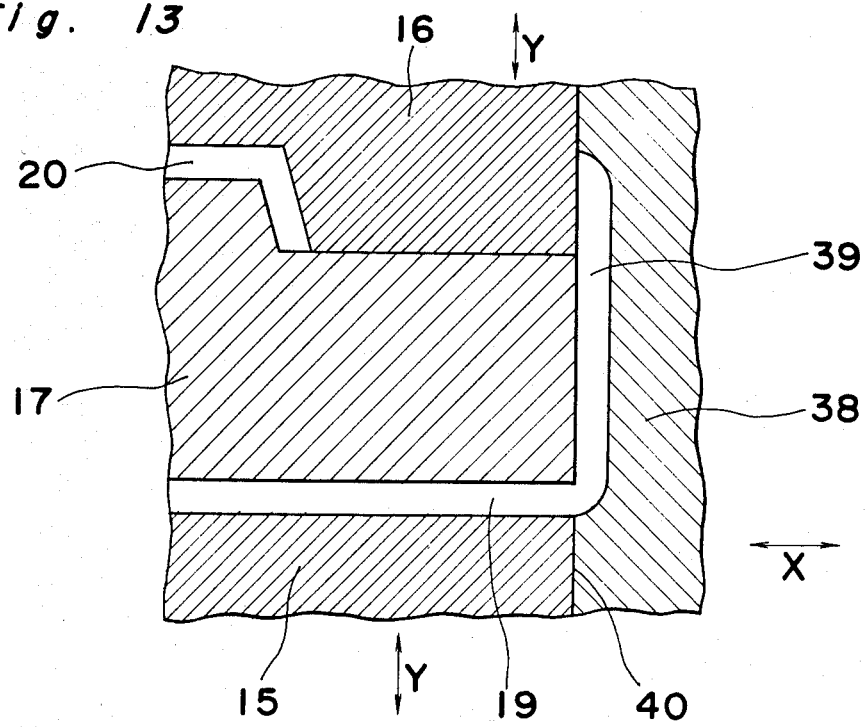
FIG. 13 is a partial cross sectional view of a part of a mold used in making the shutter.

FIG. 13 shows a structure of an essential portion of a mold for molding the shutter. The mold mainly comprises fixed core 17 used for forming the inner surface of the shutter 3, movable side cores 15 and 16 employed for molding the outer surfaces of the first plate 3a and second plate 3b and upper core 38 for forming the outer surface of the connecting plate 3c. By these cores there are formed spaces 20, 19 and 39 for preparing the first plate 3a, projections 11 and the second plate 3b. The molten synthetic resin material is injected into the spaces 19, 20 and 39 under a reduced pressure, and subsequently, the mold is cooled. The upper core 38 is removed in the direction X and the side cores 15 and 16 are removed in the Y direction, whereby the molded shutter 3 can be taken out of the mold. The line 40 represents a separation interface of the mold. When the shutter 3 is taken out of the mold, both of the free ends of the first plate 3a and second plate 3b of the shutter 3 resiliently abut each other as shown in FIG. 8.

Figure 8:
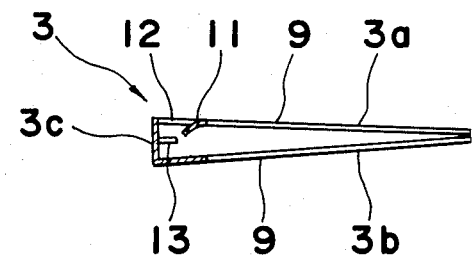
FIG. 8 is a cross sectional view taken along the lines E—E in FIG. 7.

Accordingly, in order to assemble the the shutter 3, as shown in FIG. 8, to the cartridge case 1, the free ends of the first and second plates 3a and 3b are opened as shown in FIG. 3, then the shutter 3 is inserted into the case 1 using a suitable tool (not shown). As shown in FIGS. 10 and 11, thin portions 21 are formed at the positions corresponding to the projections 11 frontward of the guide slot 7 of the first half case 1a, and the front end of the thin portion 21 is chamferred at 22. Thus, upon insertion of the case 1 with the chamferred portion 22 directed toward the shutter 3, the projection 11 of the shutter 3 rides on the chamferred portion 22, whereby the projection 11 is resiliently bent and passes over the thin portion 21 engaging the guide slot 7. As shown in this embodiment, since the projection 11 can be bent in the direction X which is the direction of insertion of the case 1 into the shutter 3, the projection 11 can easily pass over the thin portion 21 to engage in the guide slot 7.

It is noted that after each of the projections 11 is engaged in the guide slot 7, if the shutter 3 is applied with a force in the direction to disengage the shutter from the cartridge case 1, the shutter can be prevented from being disengaged by the action of the projections 11 against the inner surface 7a of the guide slot 7, since the projection 11 plants toward the connecting plate 3c.

In case the shutter 3 is formed of a synthetic resin material as a whole, it is possible to decrease the weight of the shutter compared to the conventional metal shutter, resulting in decreasing the total weight of the disc cartridge. In addition, if the disc cartridge is subjected to a strong shock by dropping for example, the metal shutter may be easily disengaged from the cartridge case due to the relatively heavy weight of the metal shutter. However, in the case of the plastic resin shutter of the present invention, the shutter can be prevented from being disengaged from the cartridge case due to its relatively light weight, even if a shock is applied to the cartridge case 1.

Figure 14:
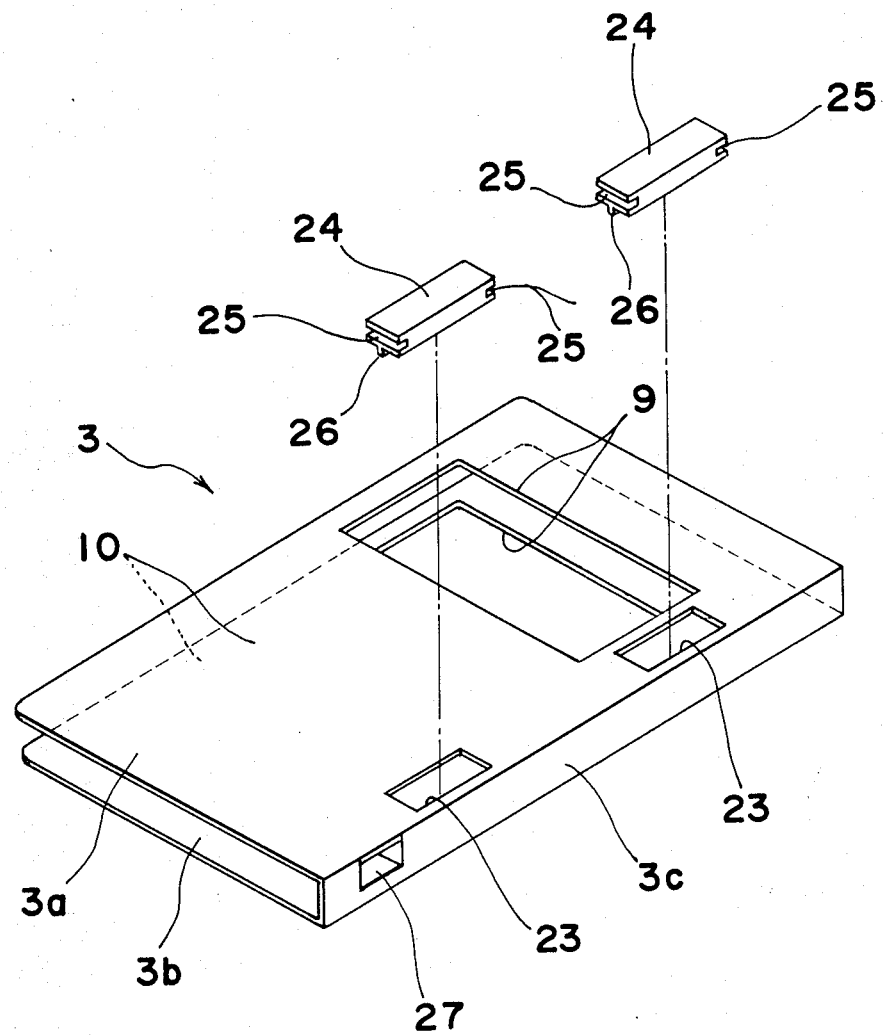
FIG. 14 is an exploded perspective view of a shutter of the second embodiment of the disc cartridge according to the present invention.
Figure 15:
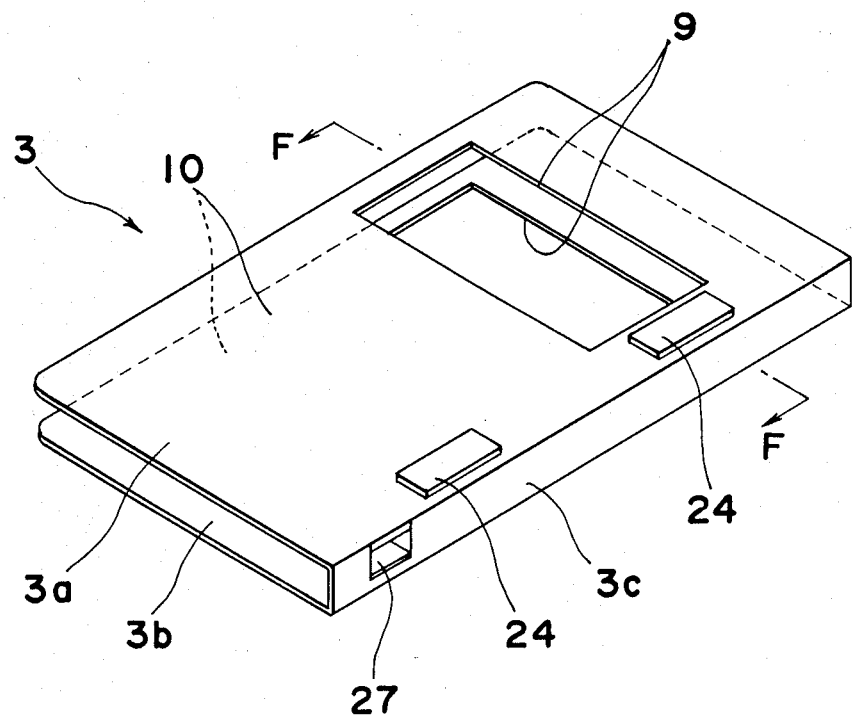
FIG. 15 is a perspective view of the shutter shown in FIG. 14 in the assembled condition.
Figure 16:
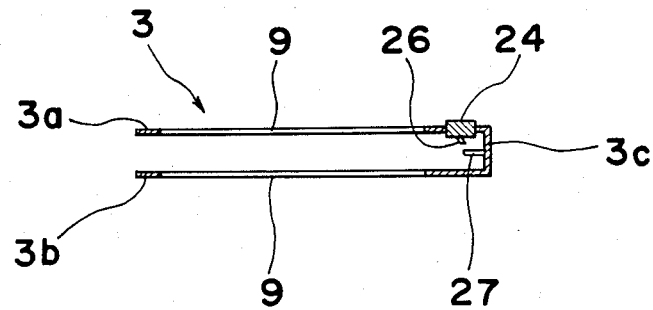
FIG. 16 is a cross sectional view taken along the lines F—F in FIG. 15.

Referring to FIGS. 14 to 16 showing a second embodiment of the disc cartridge according to the present invention, the first plate 3a, second plate 3b and the connecting plate 3c of the shutter 3 are formed of a thin stainless sheet with the openings 9 and the lid plate 10.

Rectangular openings 23 for mounting projection tips 24 are defined in the first plate 3a near the connecting plate 3c at a predetermined interval. The projection tips 24 are formed of plastic resin materials such as polyacetal resin or polyamide resin, having a suitable resiliency. There are defined engaging slots 25 on both side faces of the projection tip 24 with a projection 26 formed on the lower surface of the projection tip 24. The projection tips 24 are respectively fitted in the rectangular openings 23 with the slot 25 engaged with the peripheral edge of the opening 23 so that the projection tip 24 can be secured to the first plate 3a of the shutter 3, as shown in FIG. 15.

When the shutter 3 is mounted on the cartridge case 1 by insertion of the shutter 3, the projection 26 can be slidably fitted in the guide slot 7 by the deformation of the projection 26.

Figure 9:
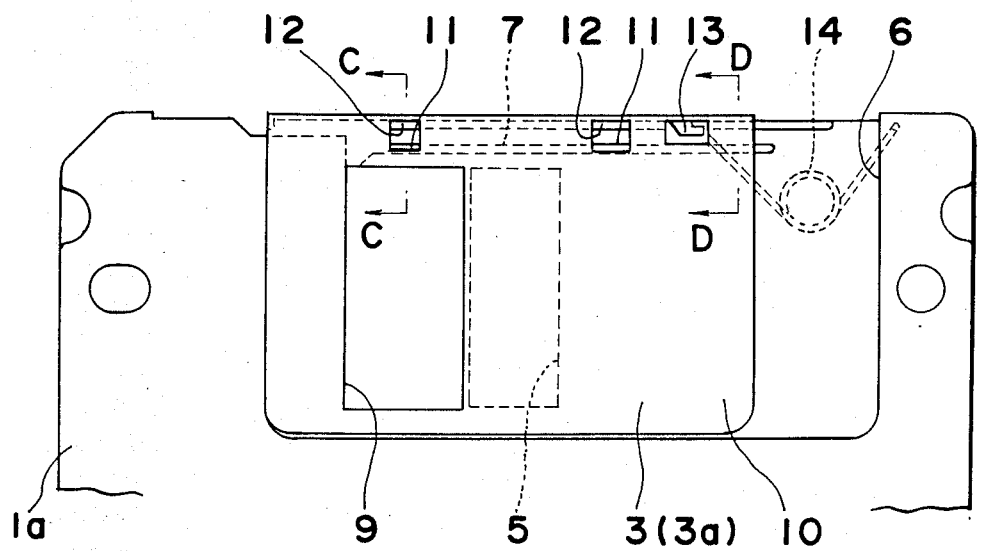
FIG. 9 is a partial top plan view of the disc cartridge according to the present invention showing a condition when not in use.

A spring engaging member 27 is formed on the connecting plate 3c by raising part of the connecting plate 3c. One end of the coil spring 14 is engaged with the engaging member 27 in the same manner as shown in FIG. 9.

Figure 17:
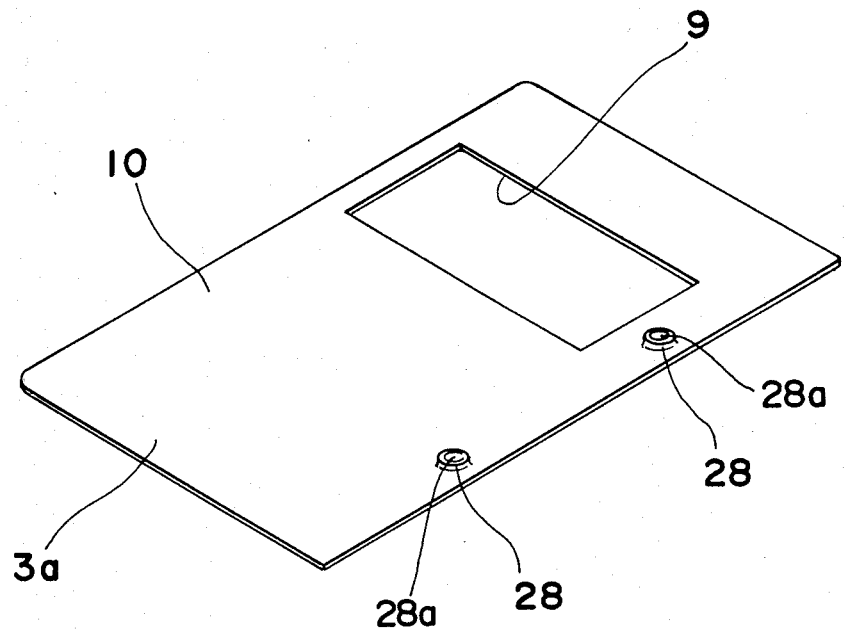
FIG. 17 is a perspective view of a shutter used in a third embodiment.
Figure 18:
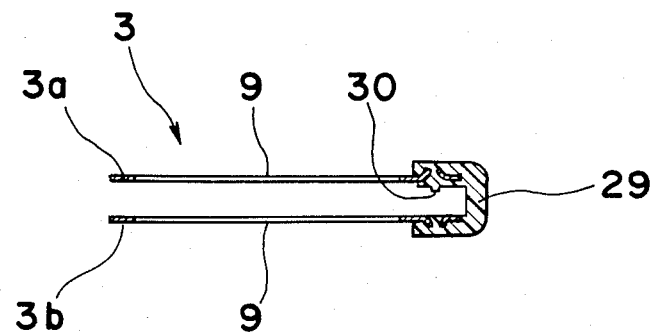
FIG. 18 is a cross sectional view of the shutter used in the third embodiment of the disc cartridge according to the present invention.

Referring to FIGS. 17 and 18 showing a third embodiment of the present invention, the first plate 3a and the second plate 3b are separately formed of a light stainless steel sheet with a plurality of bosses 28 formed near the one side edge of the plate. The bosses 28 are formed by punching the stainless steel plate, with through holes 28a also punched. As shown in FIG. 18, the stainless plates 3a and 3b are connected together by an insert molding method using a connecting member 29 formed in a channel shape. Portions of the resin materials forming the connecting member 29 are passed through the punched through holes 28a from the outside to the inside of the connecting member so as to reinforce the connection between the the first and second plates 3a and 3b and the connecting member 29.

Two projections 30 (only one of them is shown in FIG. 18) project inwardly from the connecting member 29 through the holes 28a of the first plate 3a so that the projections 30 serve, as the projections 11, for slidably engaging in the guide slot 7 which, although not shown in FIGS. 17 and 18, is the same slot as shown in FIG. 3.

Figure 19:
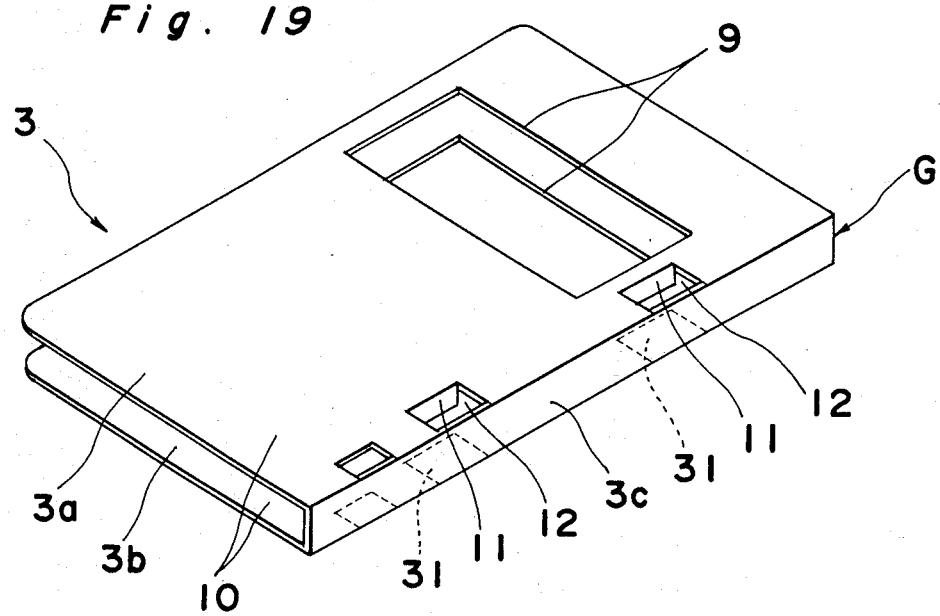
FIG. 19 is a perspective view of a shutter used in a fourth embodiment.
Figure 20:
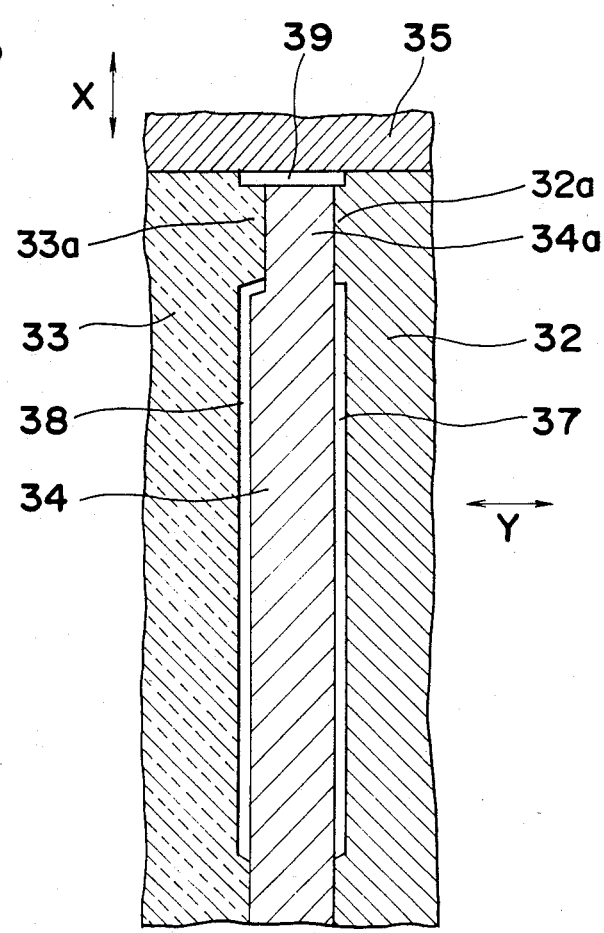
FIGS. 20 is a cross sectional view of a mold used for making the shutter according to the present invention.

Referring to FIGS. 19 and 20 showing a fourth embodiment of the present invention, the shutter 3 shown in FIGS. 19 and 20 is generally similar to the shutter 3 shown in the first embodiment except that there are defined a pair of openings 31 on the second plate 3b corresponding to the first openings 12 of the first plate 3a. The second openings 31 are necessary to decrease the error of the thickness between the first plate 3a and second plate 3b as mentioned hereinafter with reference to FIG. 20.

A mold for molding the shutter 3 mentioned above comprises side cores 32 and 33, a fixed core 34 between the cores 32 and 33 and a upper core 35. A space 37 for making the second plate 3b is defined by the cores 32 and the fixed core 34. Another space 38 for the first plate 3a is defined by the cores 33 and 34. A further space 39 for the connecting member 3c is defined by the fixed core 34 and the upper core 35. The first openings 12 are respectively defined by the part of the side core 33 and the second openings 31 are respectively defined by the part of the side core 32.

In case the shutter 3 is molded using a gate G, if the first openings 12 are defined solely on the first plate 3a without the second openings 31 on the second plate 3b, and the projection 11 is formed at the opening 12, there occurs a difference of the flow resistivities in the space 38 and 37, that is the flow resistance of the space 38 is greater than the space 37. In addition, if the free end 34a of the core 34 is not supported, the molten resin can flow easier in the space 37 than the molten resin in the space 38, so that the side core 34 may be inclined toward the side core 33 by the pressure of the injected resin. Thus, naturally, the second plate 3b is thicker than the first plate 3a, thereby resulting in fault of the molding.

In order to avoid this fault, in the embodiment, the end 34a of he fixed core 34 is clamped by the slidable side cores 32 and 33 to prevent inclination of the fixed core 34 thereby enabling the widths of the spaces 37 and 38 to be equal. By contacting the top projected portions 32a and 33a of the side cores 32 and 33 each having the same width (represented by the length of the projected portions 33a and 32a in the direction perpendicular to the paper of FIG. 20) of the projection 11 onto the fixed core 34a, the flow resistance of the molten resin in the space 37 may be made generally equal to the flow resistance in the space 38 for keeping the flow speed of the molten resin in both spaces 37 and 38 equal. By the arrangements mentioned above, it is possible to make the thickness of the first plate 3a and the second plate 3b equal. In other words, according to the arrangement mentioned above, the number of inferior products of the shutter can be decreased.

In the arrangement mentioned above, the second openings 31 may be defined by insertion of a part of the side core into the space 37.

In case the first plate 3a and the second plate 3b are formed of metallic sheet, the mechanical strength of the shutter may be increased and it is possible to make the plates thin. Printing on the surface of the plate may be made easy. It is not essential to provide the thin portions 21 in the front edge portion of the disc cartridge and the slanted face 22.

Although in the embodiments mentioned above, the shutter 3 is used exclusively for opening and closing the head insertion hole 5, it may be possible to use the shutter for opening and closing the head insertion hole 5 and opening 4 for insertion of the hub 8.

It may be possible to make the corner between the first plate 3a and the connection member 3c resiliently deformable when the projection 11 gets over the thin portion 21 of the cartridge case 1 so as to facilitate insertion of the shutter into the cartridge case 1.

In order to help such resilient deformation of the shutter at the corner of the connection between the first plate and connection member, in case the openings 12 are defined on a line passing the projections 11 in the direction of insertion of the cartridge case 1 into the shutter 3, the bending strength at the corner may be decreased, so that the corner can be resiliently deformed easily. These actions may be assured so long as the openings 12 are respectively defined at such areas that are near the corner between the first plate and the connection member and aligned with the projections 11 in a direction of insertion of the shutter into the cartridge case. The deformation of the corner between the first plate and the connection member may be easier as the openings 12 are closer to the corners and the openings 12 are larger, in particular the openings 12 are elongated in the direction of the insertion of the cartridge case 1, whereby the arrangement mentioned above is desired to insert the shutter into the cartridge case 1 with a decreased force. In particular, in case the shutter 3 is made of synthetic resin materials, it is suitable since the amount of the deformation at the corner is large.

Various modifications of the shutter for use in the disc cartridge are shown in FIGS. 21 to 24.

Figure 21:
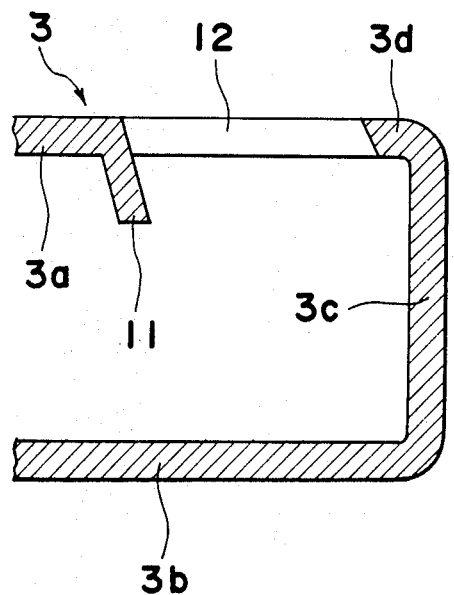
FIGS. 21 through 24 are respectively cross sectional views of various modifications of the shutter.

In the modification of the shutter 3 shown in FIG. 21, a short projection 3d is formed toward the opening 12 from the connection member 3c. The short projection 3d serves to the width of the opening for preventing entrance of dust or the like in the cartridge case through the opening 12.

Figure 22:
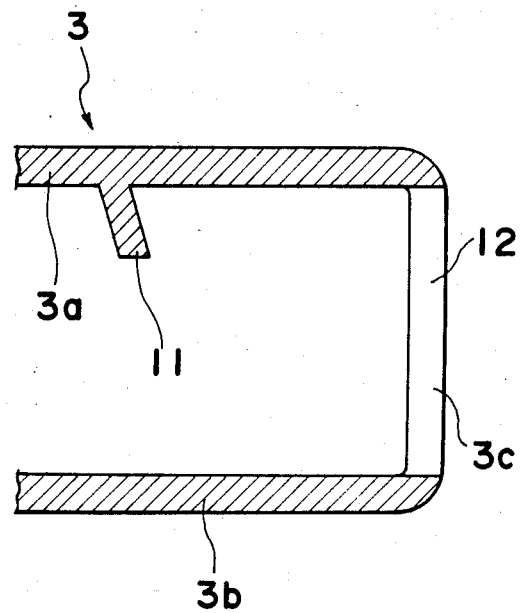

In the modification of the shutter 3 shown in FIG. 22, the opening 12 is defined in the connection member 3c.

Figure 23:
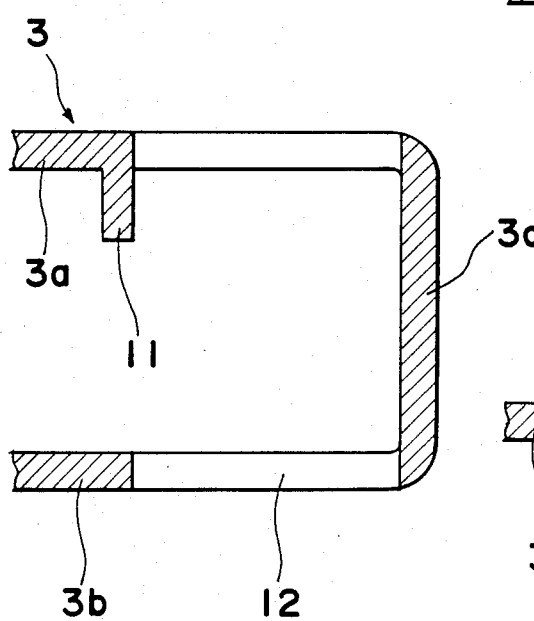

In the modification of the shutter 3 shown in FIG. 23, the openings 12 are defined on both of the first plate 3a and the second plate 3b being aligned with the projection 11.

Figure 24:
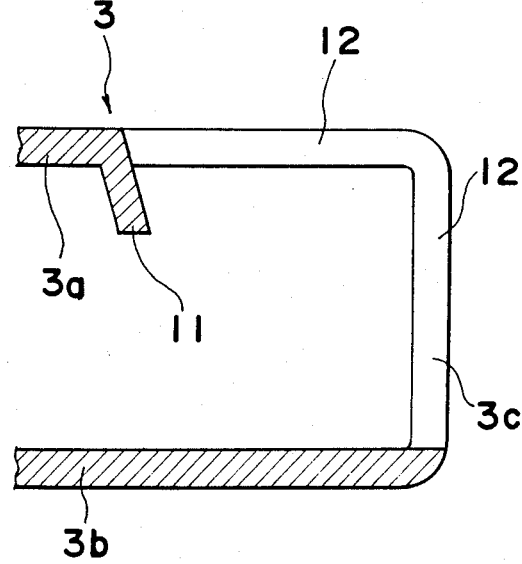

In the modification of the shutter 3 shown in FIG. 24, the opening 12 is defined on the first plate 3a and connection member 3c, being aligned with the projection 11.

It is an advantage of the present invention that the shutter can be easily inserted on to the cartridge case since the projections 11 are formed of synthetic resin materials slanted in the direction of insertion of the shutter on to the cartridge case.

It is a further advantage that since the projections 11 of the shutter 3 are formed of synthetic resin materials, wearing of the guide slot 7 of the cartridge case and projections 11 can be prevented and the sliding resistance of the shutter against the cartridge case is decreased, thereby enabling a smooth sliding motion of the shutter.

It is a further advantage that since the first opening 12 is defined being aligned with the projection 11 on the first plate and the second opening is defined on the second plate corresponding to the first opening, the first plate and the second plate of the shutter can be made with a generally thin and equal thickness, thereby assuring a smooth motion of the shutter.

It is noted that the present invention may be applied not only to a disc cartridge having a magnetic recording disc but to a disc cartridge having an optical recording disc.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A disc cartridge comprising:
   a cartridge case comprising a first half case and a second half case, a drive shaft insertion opening defined in a central portion of said cartridge case, a shallow recess defined in a front portion of each half case, corresponding head accessing openings defined in each of said shallow recesses and a guide slot provided on at least one of said first half case and said second half case near a front edge of said cartridge case extending parallel to said front edge of said cartridge case,
   a magnetic disc rotatably mounted in said cartridge case; and
   a shutter slidably mounted on said cartridge case for opening and closing said head accessing openings, movable along said respective guide slot, said shutter being formed in a general U character shape comprising first and second parallel flat plates joined by a connecting plate, said shutter presenting an open end for insertion of said shutter on said cartridge case, each of said first and second flat plates being provided with openings which coincide with said head accessing openings during opening of the shutter, said shutter being provided with at least one projection provided on at least one of said first and second flat plates closely positioned to said connecting plate extending angularly inward relative to the other of said respective plates, said at least one projection including an elongated portion terminating at a free end, said elongated portion extending at an obtuse angle from said flat plate toward said connecting plate, said projection being made of a resin material which allows said projection to temporarily deform as the shutter is mounted on said cartridge case and to spring back to be captured in one of said guide slots.

2. The disc cartridge according to claim 1, wherein said entire shutter is formed of a synthetic resin material.

3. The disc cartridge according to claim 1, wherein said U shaped shutter comprises a metal shutter body having first and second metal plates opposing one another joined by a metal connection member for connecting said first and second metal plates and projections made of synthetic resin materials mounted at a predetermined position on one of said first or second plates.

4. The disc cartridge according to claim 1, wherein said shutter comprises a first plate and a second plate opposing to said first plate, each being formed of a metal, and a connecting member made of a synthetic resin material for connecting said first and second metal plates so as to form said generally U character shape, said projections being formed on said connecting plate made of said synthetic resin material.

5. The disc cartridge according to claim 1, wherein said obtuse angle of the projection relative to the respective first or second plate is from 95° to 120°.

6. The disc cartridge case of claim 1, wherein said projection comprises two projections provided at a predetermined interval along an imaginary line parallel to said connecting plate.

7. The disc cartridge of claim 1, wherein thin portions of said cartridge case are formed near said front edge of said cartridge case between said respective guide slots and respective front edge of said cartridge case, said thin portions of said cartridge case being positioned thereon corresponding to the location of said at least one projections on said shutter such that when said shutter is mounted on said cartridge case said thin portions are resiliently deformed thereby facilitating the mounting of said shutter via said projections on said cartridge case.

8. The disc cartridge of claim 1, wherein a first opening is provided in one of said first and second flat plates of said shutter at the location of said at least one projection having a width equal to or greater than the width of said projection and at least a second opening is defined in the other of said first and second plates of said shutter opposite to said at least one first opening.

9. The disc cartridge according to claim 8, wherein said second opening has a same size and shape of said first opening.